Nov. 6, 1951 T. R. SMITH 2,574,297
DIAPHRAGM SEAL FOR HIGH PRESSURES
Filed July 31, 1946
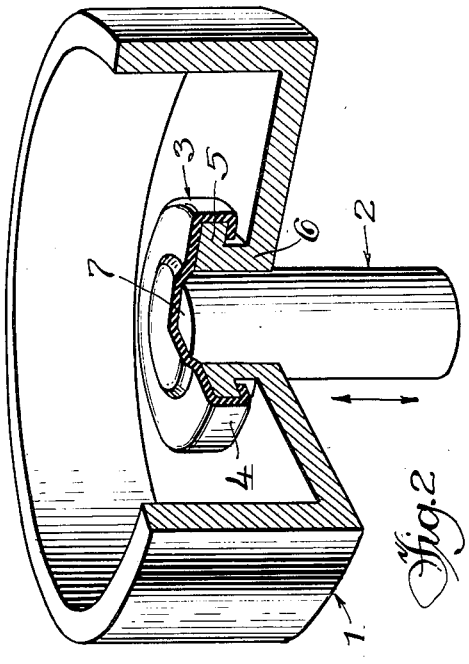
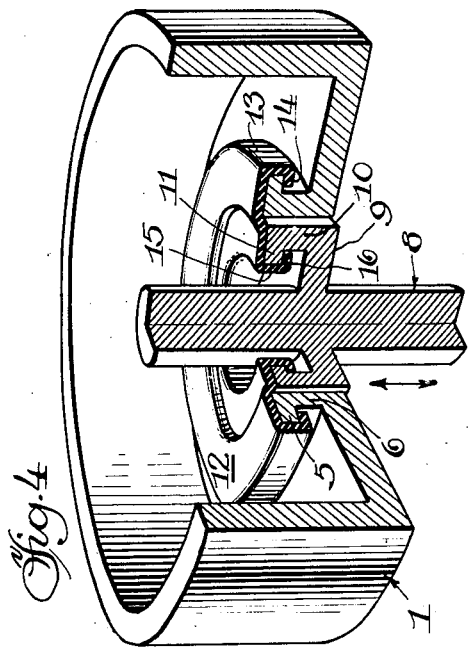
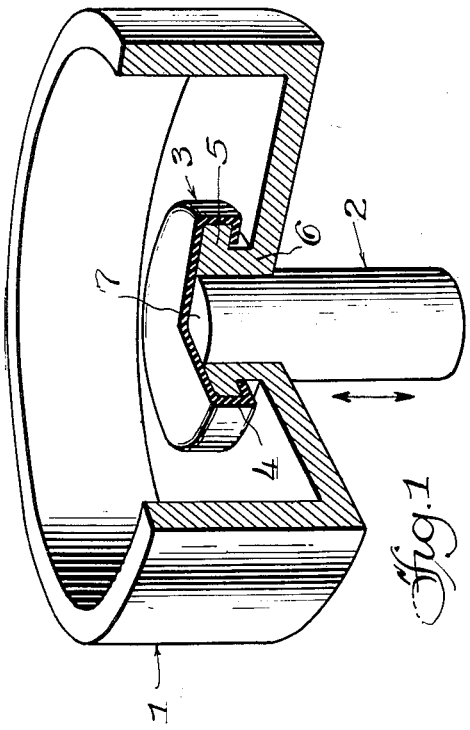
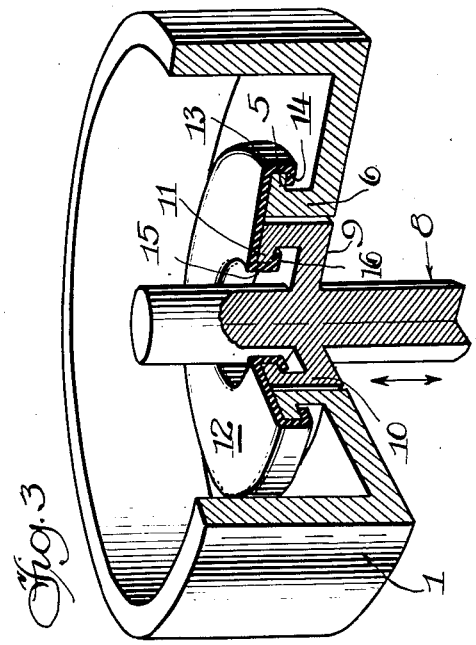
INVENTOR.
Thomas R. Smith
BY Patented Nov. 6, 1951

2,574,297

UNITED STATES PATENT OFFICE 2,574,297

DIAPHRAGM SEAL FOR HIGH PRESSURES

Thomas R. Smith, Newton, Iowa, assignor to The Maytag Company, Newton, Iowa, a corporation of Delaware Application July 31, 1946, Serial No. 687,260

3 Claims. (Cl. 137—157)

The present invention relates to a diaphragm type of seal formed of an inexpensive resilient material which may be quickly and easily stretched and snapped into place and retained thereat by its resilient characteristics.

Diaphragm seals of an elastic or resilient material and with prior assemblies have not previously been successful for the reason that such seals would not hold their shape nor withstand the pressures involved without stretching or bulging. For that reason conventional forms of diaphragm seals have generally been constructed of metal in order to withstand the high pressures under which they operate. The above objectionable features have been eliminated by the present invention of seal construction and novel assembly wherein a sealing diaphragm is constructed of a rubber or rubber-like material and which diaphragm may be employed either as a cap seal or as an annular diaphragm seal. When employed as a cap seal the diaphragm seats against an end of and operates an actuator or actuating rod, whereas when employed as an annular seal the end of the actuating rod may pass through the annular sealing diaphragm.

Among the objects of the present invention is to provide a novel diaphragm seal of an inexpensive resilient material that is highly effective in operation and in which the pressure of the fluid being sealed tends to maintain the seal and increase its sealing effectiveness as the pressure increases.

The invention further comprehends a novel seal for sealing between an actuating shaft and a pressure container where these members are so constructed and arranged as to provide merely sliding or operating clearance therebetween. In the present novel embodiment, the seal is stretched and snapped into place and retained by its inherent resiliency, thereby requiring no special sealing compounds or mechanical expedients to hold the diaphragm in position.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a fragmentary perspective view of a novel diaphragm seal and assembly for high pressures.

Fig. 2 is a view similar to Fig. 1 but showing the actuating rod moved with respect to the pressure container.

Fig. 3 is a fragmentary perspective view of an alternate construction of diaphragm seal and assembly in which the actuating rod projects through the pressure container and the sealing is accomplished by an annular sealing element.

Fig. 4 is a view similar to Fig. 3 but showing the actuator or actuating rod moved from the position shown in Fig. 3 and with respect to the pressure container.

Referring more particularly to the drawing and especially to the novel illustrative embodiment of the invention shown in Figs. 1 and 2, the assembly comprehends a pressure container 1 shown as provided with a centrally disposed actuator or actuating rod 2 movable relative to the container. The rod and container are so constructed and arranged as to provide only sliding or operating clearance therebetween so as to eliminate any clearance of sufficient dimensions to allow any portion of the resilient diaphragm 3 to extrude into the space therebetween due to pressure in the pressure chamber.

The diaphragm is formed at its edge or circumference 4 in such manner that it may be stretched over an outwardly projecting annular flange 5 formed on an upstanding collar or sleeve 6 at the inner diameter of the pressure container 1 and providing an undercut anchoring portion for the diaphragm. In this form of the invention, the end 7 of the actuating rod 2 abuts the diaphragm and due to the resiliency of the latter, the rod may be moved with respect to the container. The amount of longitudinal movement of the rod depends upon the thickness of the diaphragm and the pressure involved. The pressure on the inside of the container causes the thin resilient diaphragm to conform to the shape of the surfaces on the actuating rod and adjacent flange on the pressure container in the manner shown in Fig. 2.

In Figs. 3 and 4 is shown an alternate construction in which the actuating rod 8 extends through the pressure container 1 and the latter is provided with a collar or sleeve 6 having an annular, outwardly projecting flange 5 providing an undercut diaphragm anchoring portion similar to that of Figs. 1 and 2, and the actuating rod 8 is provided with an annular enlargement 9 having an upstanding collar or sleeve 10 provided with an inwardly projecting flange 11. A resilient diaphragm 12 has its outer diameter or circumference provided with a depending flange 13 merging into a lip 14 seating beneath the flange 5 on the pressure container 1, while the inner diameter or circumference is provided with a depending flange 15 merging into an inturned lip 16 seating beneath the flange 11, with the upper surface of this flange 11 engaging the diaphragm and providing an abutment surface. As the annular diaphragm 12 is stretched over and snapped onto the opposed flanges 5 and 11 of the pressure chamber or container 1 and the actuating rod 8, respectively, it becomes anchored in position and requires no auxiliary sealing compounds or mechanical means for retaining it in such position.

In each form of the invention, the actuating rod is moved relative to the pressure container or chamber and the diaphragm is disposed on the pressure side in such manner that the pressure within this chamber causes the thin and resilient diaphragm to conform to the shape of the adjacent rigid abutting surfaces on the actuating rod and pressure container. In installations where such a diaphragm is employed, there is but a limited longitudinal movement of the actuating rod so that there is no danger of the diaphragm being distorted or stretched beyond its elastic limits. By reason of the novel assembly and arrangement, self-sealing is accomplished and the sealing effectiveness is increased as the pressure on the upper or pressure side of the container increases. Excellent results have been obtained by making the diaphragm of an inexpensive resilient or elastic material such as natural or compounded synthetic rubber.

It will be apparent from the above description and the disclosure in the drawings that the invention comprehends a novel diaphragm seal and assembly in which the diaphragm is not damaged by being stretched when pressure is applied and is not in danger of being extruded between the cooperating or coacting surfaces on the pressure container or chamber and the actuating rod. As disclosed in Figs. 2 and 4, the diaphragm is shown conforming to the shape which it may assume under fluid pressure and as the actuating rod is moved with respect to the pressure container the pressure on the interior of the container causes the thin diaphragm to conform to the shape of the cooperating surfaces on these members. It is, of course, understood that the actuating rod or member in operative relation has suitable mechanical construction to maintain it in proper relation with the diaphragm and the pressure chamber.

Having thus disclosed my invention, I claim:

1. In a seal assembly, a container having a pressure chamber and an opening in a wall thereof, an actuating rod having an end conforming to and projecting into the opening and movable relative to the container, a unitary seal and diaphragm disposed wholly within the container and having a turned in peripheral portion, said diaphragm being of relatively thin and substantially uniform cross section, and a flange on said wall of the container about the opening therein and received within the turned in portion of the diaphragm to prevent leakage through said opening, said diaphragm being supported over the entire surface thereof on its side facing the opening and the actuating rod and being unsupported on the side facing the pressure chamber, said diaphragm operating said rod in response to the pressure of fluid within the container.

2. In a self-sealing diaphragm seal assembly, a body member providing a pressure chamber and having a sleeve portion projecting into the chamber from a wall of said body member, said sleeve having a radially extending annular flange concentric to the opening of the sleeve and providing an undercut adjacent its outer periphery, a longitudinally movable actuator disposed in the opening and provided with an abutment surface adjacent said flange, and an imperforate resilient diaphragm of relatively thin and substantially uniform cross-section supported over its entire surface by the abutment surface and flange and having an outer peripheral portion of substantially U-shape to receive and enclose the flange, the entire diaphragm being acted upon and maintained in sealing position with the flange by the fluid under pressure within the chamber to prevent leakage of fluid through said opening.

3. In a diaphragm seal assembly, a container defining a chamber and provided with an opening therein, an annular flange integral with said container and providing therewith an undercut portion and having a top surface positioned in the chamber about the opening, an actuating member disposed in the opening and longitudinally movable relative to said container, said member being provided with an abutment surface adjacent the top flange surface, and an elastic diaphragm of relatively thin and substantially uniform cross-section for sealing said opening, said diaphragm being contoured to cover said flange, the undercut portion thereon, the opening and the abutment surface of said actuating member, and being held in position against the flange and abutment surface by the pressure of fluid in the chamber.

THOMAS R. SMITH.

REFERENCES CITED

The following references are of record in the file of this patent:

UNITED STATES PATENTS

| Number | Name | Date |
|---|---|---|
| 103,893 | Kent | June 7, 1870 |
| 669,669 | Squires | Mar. 12, 1901 |
| 1,062,300 | Pierce | May 20, 1913 |
| 1,934,545 | Langdon | Nov. 7, 1933 |
| 2,175,431 | Ericson | Oct. 10, 1939 |
| 2,208,149 | Vernet | July 16, 1940 |
| 2,212,246 | Pierce | Aug. 20, 1940 |
| 2,228,435 | Binon | Jan. 14, 1941 |
| 2,265,496 | Shaw | Dec. 9, 1941 |
| 2,471,579 | Neuroth | May 31, 1949 |